March 10, 1970     J. L. LANKFORD ET AL     3,499,311
OMNIDIRECTIONAL BLAST WAVE SENSOR
Filed April 7, 1967

INVENTORS
John L. Lankford
Arnold E. Seigel
R. E. Wilson

BY J. O. Tresansky
ATTORNEY

United States Patent Office 3,499,311
Patented Mar. 10, 1970

3,499,311
OMNIDIRECTIONAL BLAST WAVE SENSOR
John L. Lankford, Silver Spring, and Arnold E. Seigel,
 Chevy Chase, Md., and Robert E. Wilson, Menlo Park,
 Calif., assignors to the United States of America as
 represented by the Secretary of the Navy
Filed Apr. 7, 1967, Ser. No. 629,878
Int. Cl. G01n *33/22;* G01l *9/00*
U.S. Cl. 73—35                1 Claim

ABSTRACT OF THE DISCLOSURE

An omnidirectional pressure gage for measuring weak blast waves in which a pressure sensing element is encapsulated within a porous spherical shell.

The invention described herein may be manufactured and used by or for the Government of the United States of America for governmental purposes without the payment of any royalties thereon or therefor.

BACKGROUND OF THE INVENTION

This invention relates to a pressure measuring device and more particularly to a gage for measuring static over pressures which accompany blast wave fronts.

With an increase in the number of field studies of air pressures from weak blast waves or from strong blast waves at a distance, a need exists for a simple sensor which is relatively insensitive to the direction of the source of the blast wave. In making such field studies it is also desirable to have an instrument in which the static pressure behind the blast wave front may be obtained directly and accurately without recourse to complex or tedious calibrations tests, charts or repetitive procedures.

In the past, generally two approaches have been made in the measurement of static over pressures which accompany weak blast waves. One approach involved the use of a gage having a streamlined aerodynamic shape with pressure orifices or electronic pickups which were located such that the pressure measured is a value close to the value of the pressure of the static stream behind the blast front. Wind tunnel studies were used to locate the orifice position for the uncorrected gages and for calibrating the error at values equivalent to moderate blast pressures. The second approach utilized Pitot type gages having cavities which were tuned so that the resultant pressure in a cavity could be calibrated against the static or total pressure behind a weak blast wave.

Both of these approaches require critical orientation of the gages with respect to the direction of the source of the wave blast and also require tedious calibration procedures in arriving at the true values of the pressure measured.

SUMMARY OF THE INVENTION

It is therefore an object of this invention to provide a simple omnidirectional pressure gage for measuring static over pressures behind blast wave fronts.

Another object of this invention is to provide a pressure gage which is omnidirectionally sensitive to blast wave pressures.

A further object of this invention is to provide a pressure gage for measuring static over pressures accompanying blast waves in which pressure measurements may be obtained directly and without complex calibration procedures.

In accordance with a preferred embodiment of this invention, these and other objects are attained by the use of a ventilated sphere which encapsulates a transducer.

BRIEF DESCRIPTION OF THE DRAWINGS

A more complete appreciation of the invention and many of the attendant advantages thereof will be readily appreciated as the same becomes better understood by reference to the following detailed description when considered with the accompanying drawing wherein.

DESCRIPTION OF A PREFERRED EMBODIMENT

Figure 1:
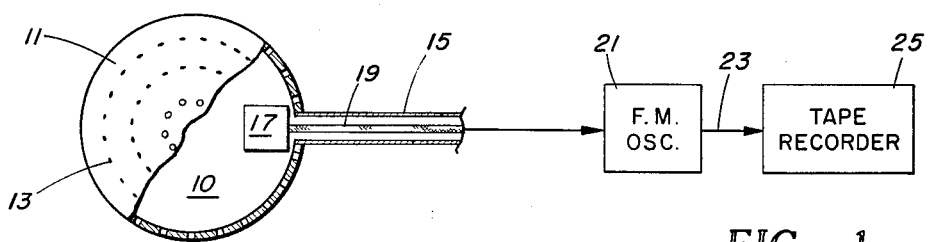
FIG. 1 is a view, partially sectional and partially schematic, illustrating an embodiment of the pressure gage of this invention.

Referring to FIG. 1, a pressure gage identified generically by reference numeral 10 is shown as including a ventilated spherically shaped shell 11 having holes or perforations 13 formed therein which are substantially equidistantly spaced supported by tube or sting member 15. Sphere 11 encapsulates a transducer 17 which is connected by a conductor 19 disposed in tube 15 to an FM oscillator 21. The FM oscillator 21 is connected by a conductor 23 to a tape recorder 25.

Figure 2:
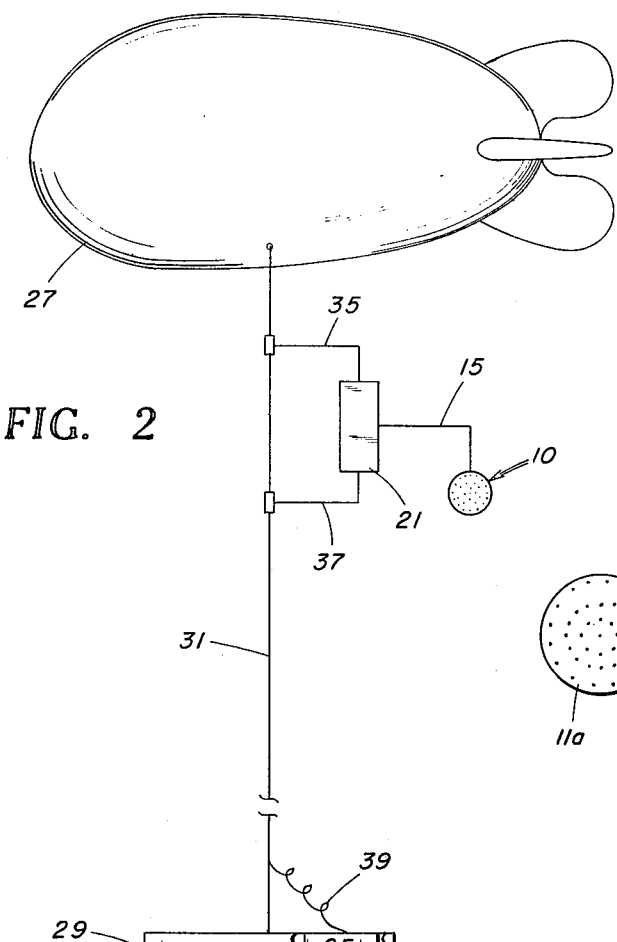
FIG. 2 is a schematic view illustrating the use of the instant invention on a body of water.

An example of an operational use of the pressure gage of this invention is shown in FIG. 2. A balloon 27 is connected to a floatation unit 29 by a cable 31. Pressure gage 10 is suspended in air by means of cable 31. The pressure gage 10 is connected through a tube 15 to the FM oscillator 21. Oscillator 21 is mounted on cable 31 by mounting means such as pipes or tubes 35 and 37. The oscillator 21 is connected to a tape recorder disposed in the floatation unit 29 through an electrical cable 29 which is disposed along cable 31 and through tubing 37 to oscillator 21.

The transducer and FM oscillator as used in this invention are commercially available as a pressure transducer or "ultradyne transducer" from the Consolidated Controls Corporation of Bethel, Connecticut. The response time of the system including the gage, transducer, FM oscillator and tape recorder is approximately 0.5 millisecond, the response time of the pressure gage 10 including the sphere 11 and transducer 17 being 0.3 millisecond or less.

A typical sphere employed in a preferred embodiment of this invention may be made of brass material having a thickness of $1/10$ inch and plated on both surfaces with nickel. The sphere may have a diameter of 2 inches and 258 equidistantly spaced holes with a diameter of 0.055 inch formed therein comprising about 4.87% of the surface area of the sphere. The ratio of hole diameter to sphere diameter is .0275. Spheres of the type described herein have been tested with good results in a range of 3 to 10 p.s.i. static over pressures. The spherical shell may also be formed of wire mesh material such, for example, as sintered wire sheet.

Figure 3:
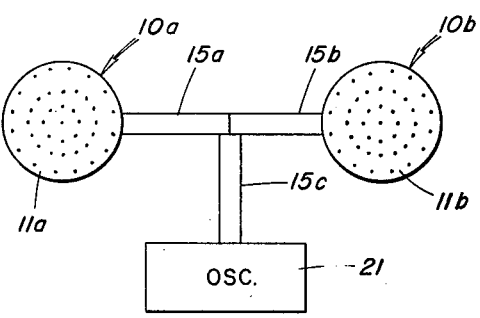
FIG. 3 is a view illustrating the use of two pressure gages according to this invention.

In an alternative embodiment of FIG. 3, two pressure gages 10a and 10b having spherical shells 11a and 11b, respectively, are connected through supporting tube members 15a, 15b and 15c to oscillator 21. Electrical conductors inside the tubing members, not shown, connect the gages to oscillator 21. This arrangement provides an increase in the range of the gage of the instant invention to approximately 180° whereas the single gage omnidirectional range is approximately 70°. If a further increase in the omnidirectional characteristic is desired, an array of sensors may be employed which are mounted on stings which project radially outwardly from a common central point to effectively form a large sphere.

In operation, a blast wave front traveling toward the pressure gage will be accompanied by static pressures preciding the wave front which will be substantially atmospheric and static pressures behind the wave front which will be appreciably higher than atmospheric. A pressure sensor which is in the path of travel of a blast wave front will experience a discontinuous rise of pressure followed by a period of gradual decay. In the case of a weak blast wave, the blast wave front will have traveled a long distance before meeting the gage and the wave front will have expanded in size until the portion sensed by the gage will exhibit initial characteristics similar to a plane wave front traveling across the gage followed by a slight pressure rise and a subsonic flow field.

Immediately after the passage of the blast wave front, the exterior surface of the sensor is subjected to pressures accompanying the hock wave. The interior of the phere, however, is essentially at the ambient pressure which existed before the arrival of the wave front. The flow rate through each opening between the exterior and interior of the sphere will depend on the area, the flow coefficient, the pressure difference and the air density.

The FM oscillator and recorder serve as a convenient means of storing pressure data. Other indicating and information storage means may be used with the pressure gage if desired without departing from the scope of the instant invention.

Obviously many modifications and variations of the present invention are mde possible in the light of the bove teachings. It is therefore to be understood that within the scope of the appended claims the invention may be practiced otherwise than as specifically described.

What is claimed as new and desired to be secured by Letters Patent of the United States is:

1. A pressure gage for measuring static overpressures accompanying a blast wave comprising:
  a spherical shell having ventilation orifices providing restricted air passages therethrough and spaced approximately uniformly therearound;
  said ventilation orifices comprising approximately five percent of the surface area of said spherical shell and the ratio of said ventilation orifice diameter to said spherical shell diameters being not more than .0275:1;
  a transducer encapsulated within said spherical shell in direct communication with said ventilation orifices, said transducer being sensitive to fluid pressure changes and being capable of producing signals proportional to said changes, and
  means coupled to said transducer for transmitting said signals to a remote processing station.

References Cited

UNITED STATES PATENTS

| | | | |
|---|---|---|---|
| 2,725,548 | 11/1955 | Harris | 73—398 XR |
| 3,034,353 | 5/1962 | Anderson | 73—212 |
| 3,098,389 | 7/1963 | Melchior | 73—384 |
| 3,158,028 | 11/1964 | Chope. | |
| 3,377,864 | 4/1968 | Todd | 73—392 |

JAMES J. GILL, Primary Examiner

U.S. Cl. X.R.

73—392, 398